Figure 1:
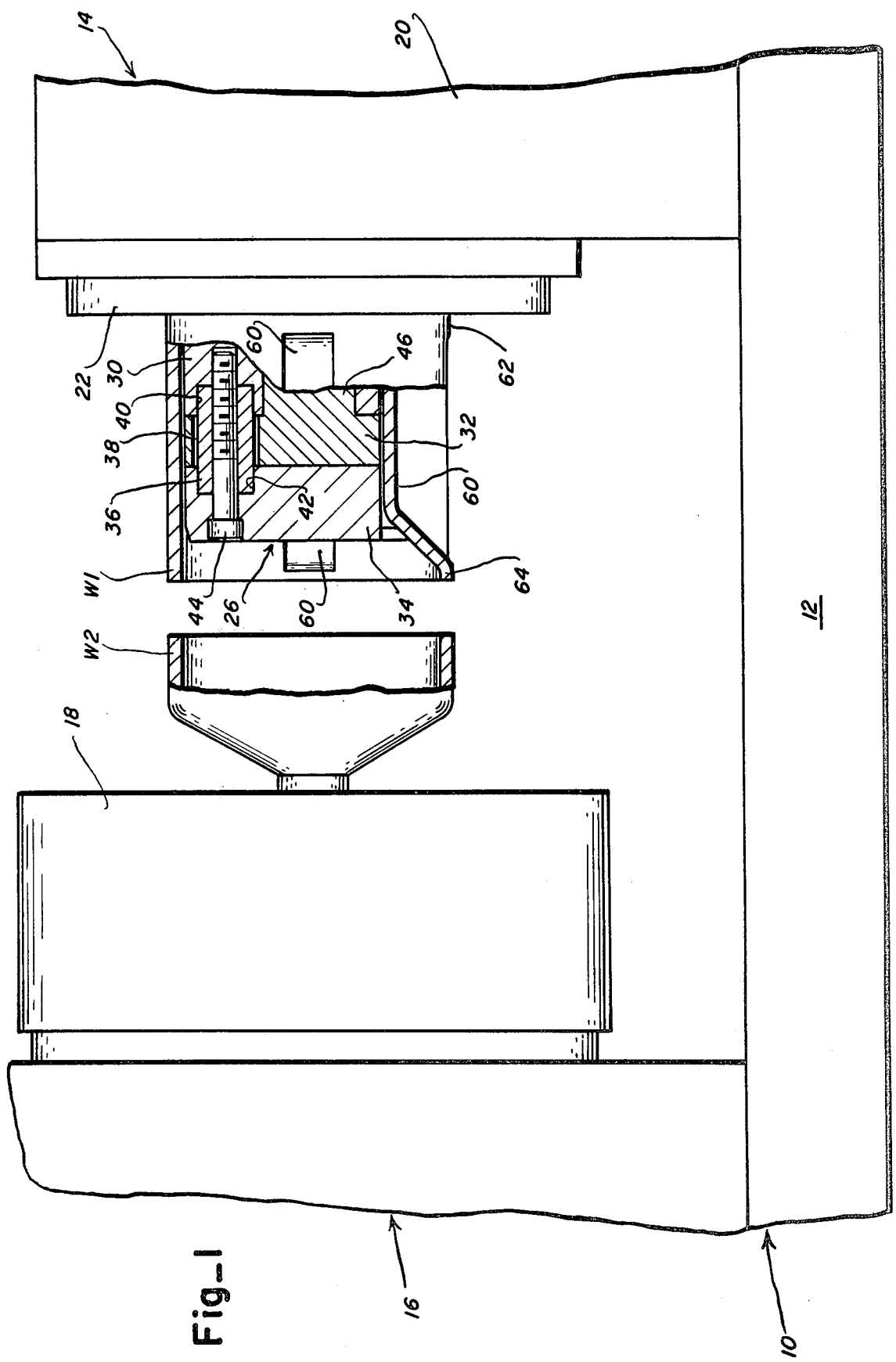

United States Patent [19]

Stevenson

[11] 4,415,172
[45] Nov. 15, 1983

[54] FRICTION WELDING MACHINE HAVING AN EXPANDING MANDREL BACKSTOP ASSEMBLY

[75] Inventor: Christopher T. S. Stevenson, New Britain, Conn.

[73] Assignee: Litton Industrial Products, Inc., New Britain, Conn.

[21] Appl. No.: 329,247

[22] Filed: Dec. 10, 1981

[51] Int. Cl.³ .............................................. B23B 31/12
[52] U.S. Cl. ..................................... 279/33; 279/2 R; 279/1 G; 269/48.1; 228/2; 409/62
[58] Field of Search .......................... 228/2; 269/48.1; 279/1 G, 2 R, 33, 34; 464/74, 158; 409/62

[56] References Cited

U.S. PATENT DOCUMENTS

| | | |
|---|---|---|
| 2,765,175 | 10/1956 | Parker et al. ........................ 279/2 R |
| 3,963,250 | 6/1976 | Flagg ................................. 269/48.1 |
| 4,066,270 | 1/1978 | Elkin ....................................... 279/2 |

*Primary Examiner*—Kenneth J. Ramsey
*Assistant Examiner*—M. Jordan
*Attorney, Agent, or Firm*—Brian L. Ribando

[57] ABSTRACT

An improved mandrel chuck for the backstop assembly of a friction welding machine holds a first interiorly lobed workpiece as a second rotating workpiece is displaced into forceful engagement therewith. The improved chuck comprises a main body portion, an end portion rigidly fixed to the main body portion, and an intermediate portion mounted between the main body portion and the end portion, all of the chuck portions having similar exterior lobes in a configuration which complements the interior lobes of the first workpiece. A hydraulic actuator rotates the intermediate portion relative to the main body and end portions to interiorly grip the first workpiece wherein one end of the first workpiece projects from and is proximate to the chuck end portion, whereby the chuck will not contribute to any outward bowing or distortion of the workpiece end.

2 Claims, 2 Drawing Figures

FRICTION WELDING MACHINE HAVING AN EXPANDING MANDREL BACKSTOP ASSEMBLY

The present invention relates to friction welding machines which have expanding mandrel backstop assemblies.

A friction welding machine holds one workpiece stationary while it laterally displaces a second rotating workpiece into forceful engagement therewith. The resulting friction heats the area of contact into a weldable mass. Upon cessation of relative displacement, the resulting weld joins the two workpieces.

If the stationary workpiece is hollow, a mandrel-type backstop assembly may be employed to securely hold it during the welding operation. The mandrel of such backstops is configured to complement the interior of the particular workpiece and includes some means for effecting internal gripping thereof. The length of the mandrel approximates but is shorter than the length of the workpiece to permit one end of the workpiece to project therefrom for welding while maximizing workpiece stability.

A hollow workpiece with interior lobes, may be gripped by a lobed mandrel chuck. Conventionally, such mandrel chucks have a stationary lobed body portion and a similarly configured rotatable end portion which complement the interior lobes of the workpiece. After the hollow workpiece has been positioned over the chuck, the chuck end is rotated to effect gripping by coaction of the mandrel lobes against the interior lobes of the workpiece. However, it has been discovered that the rotation of the mandrel end attributes to distortion of the projecting end of the workpiece when it is heated during a friction welding operation. This causes irregular weldments to be formed since the workpiece distortion becomes fixed by the weld.

It is, accordingly, an object of the present invention to provide an improved expanding mandrel backstop assembly for a friction welding machine.

Other objects and advantages of the present invention will become apparent from the following portion of the specification and from the accompanying drawings which illustrate, in accordance with the mandate of the patent statutes, a presently preferred embodiment incorporating the principles of the invention.

Figure 2:
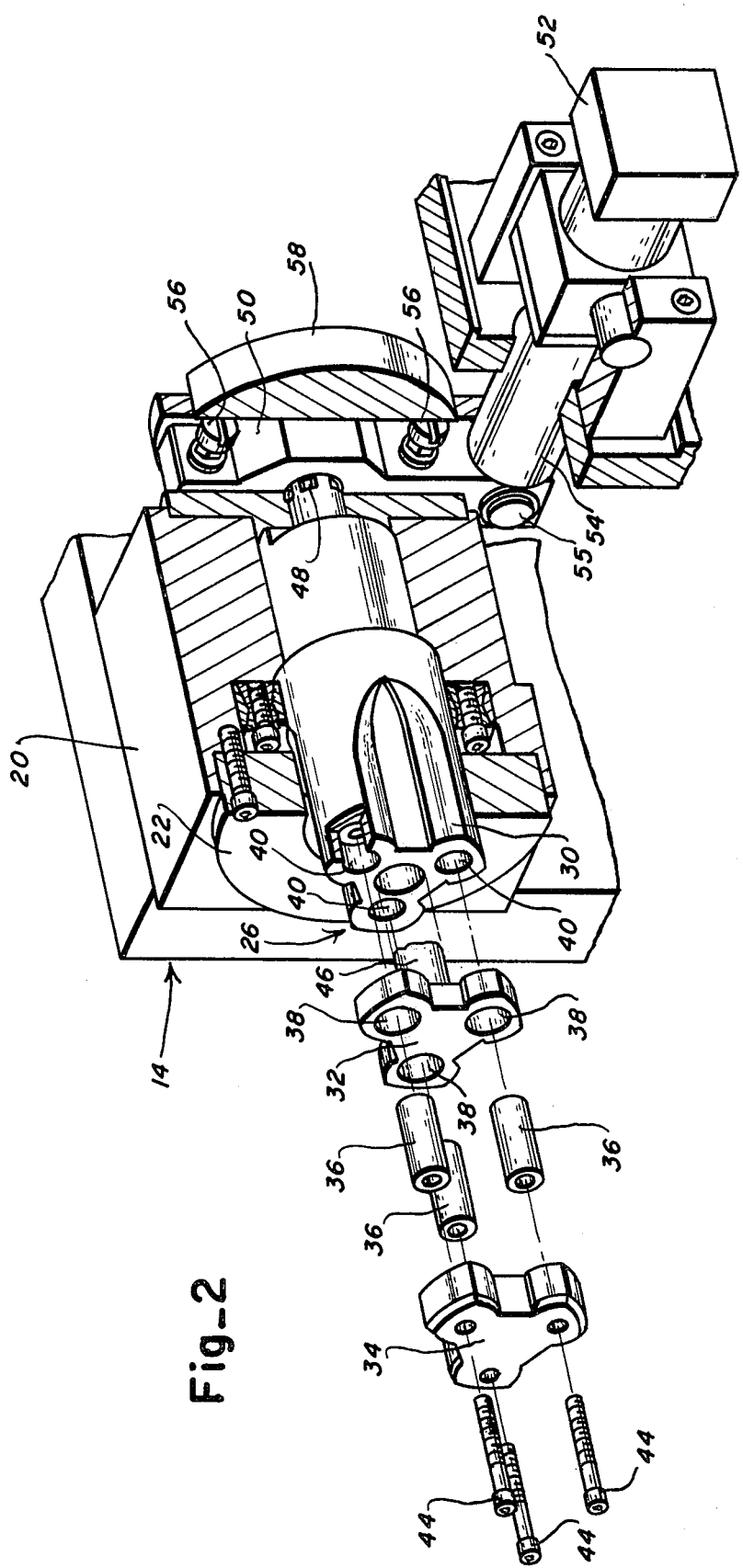

Referring to the drawings:

FIG. 1 is a side view of a friction welding machine made in accordance with the teachings of the present invention; and FIG. 2 is an exploded perspective view partially sectioned of the backstop assembly of the friction welding machine shown in FIG. 1.

As shown in FIG. 1, the friction welding machine 10 generally includes a base 12, a backstop assembly 14 for maintaining a hollow, cylindrical workpiece W1 in a stationary position, and a laterally displaceable workhead assembly 16 having a rotatable chuck 18 for displacing a second cylindrical workpiece W2 into frictional engagement with the first workpiece W1.

The backstop assembly 14 includes a housing 20 rigidly secured to the machine base 12, a workpiece stop ring 22 bolted to the housing 20, and a mandrel chuck 26 which projects through the stop ring 22. As best seen in FIG. 2, the mandrel chuck 26 has a selected three lobed shape which complements the lobed interior of the first workpiece W1 and comprises a main body portion 30, an intermediate portion 32, and an end portion 34. The end portion 34 is spaced from the main body portion 30 by three cylindrical spacers 36 which pass through oversized apertures 38 in the intermediate portion 32 and are matingly received by bores 40, 42 defined in the opposing faces of the main body and end portions 30, 34. Three bolts 44 pass through the spacers 36 to rigidly secure the end portion 34 to the main body portion 30 maintaining the intermediate mandrel portion 32 sandwiched therebetween.

The intermediate portion 32 of the mandrel 26 is integral with one end of a rotatable axial shaft 46 which extends through the main body portion 30 and has a splined second end 48 attached to lever arm 50. A hydraulic operator 52 is mounted on one side of the housing 20 and comprises a piston 54 which is attached to the end of the lever arm 50 by a pin 55. The piston displaces the arm 50 to rotate the intermediate mandrel portion 32 from a first position aligned with the end and main body portions 34, 30 of the mandrel 26 to a second workpiece gripping position. A pair of stop screws 56 which are mounted on the arm 50 limit the rotation which can be imparted to the shaft 46 to define the first and second positions of the intermediate mandrel portion 32.

In operation, the first cylindrical workpiece W1, which has three internal lobes 60, is positioned over the mandrel 26 with one end 62 abutting the stop ring 22 and the opposite end 64 projecting slightly beyond the end portion 34. The intermediate mandrel portion 32 is then rotated by the shaft 46 from its aligned position to a displaced position in order to grip the internal lobes 60 of the workpiece W1 by coaction of the lobes of the mandrel chuck 26 against the lobes 60 of the workpiece. Once the first workpiece W1 is secured on the backstop assembly 14, the workhead assembly 16 rotates and laterally displaces the second workpiece W2 into forceful engagement with the projecting end 64 of the first workpiece W1 to frictionally weld the workpieces together. During the welding operation when the first workpiece W1 becomes heated, any outward bowing or workpiece distortion contributed by the mandrel chuck 24 will occur in the region of the intermediate mandrel portion 32, removed from the projecting workpiece end 64, and will not become fixed by the resulting weld.

What is claimed is:

1. A mandrel chuck for a backstop assembly of a friction welding machine for holding a first interiorly lobed workpiece, the friction welding machine including a movable workhead assembly for displacing a second rotating workpiece into forceful engagement with the first workpiece, the chuck comprising
    a main body portion,
    an end portion rigidly fixed to said main body portion,
    an intermediate portion mounted between said main body portion and said end portion, all of said chuck portions having similar exterior lobes in a configuration which complements the interior lobes of said first workpiece, and
    means for rotating said intermediate portion relative to said main body and end portions to interiorly grip the first workpiece wherein one end of the first workpiece projects from and is proximate to said chuck end portion, whereby said chuck will not contribute to any outward bowing or distortion of said workpiece end.

2. In a friction welding machine for welding a first hollow, internally lobed workpiece and a second workpiece together, the friction welding machine including workhead means for rotating and laterally displacing the second workpiece, and a backstop assembly opposing said workhead means for maintaining the first workpiece in a stationary position, the backstop assembly comprising:

stop ring means for buttressing one end of the first workpiece, mandrel means projecting from said stop ring having an outer configuration which complements the lobed interior of the hollow first workpiece and having a length measured from said stop ring which is slightly less than the length of said first workpiece, said mandrel means having an intermediate portion sandwiched between rigidly connected body and end portions, said intermediate portion mounted for limited rotation out of alignment with said body and end portions, and means for rotating said intermediate mandrel portion to effect internal gripping of the first workpiece whereby when the first workpiece becomes heated during a friction welding operation, any outward bowing or workpiece distortion attributable to said mandrel means will occur proximate said intermediate mandrel portion and will not become fixed by the weld.

* * * * *